July 17, 1956
C. C. FOSTER
2,754,576
FABRICATION OF FORGED BRAKE BAND AND THE LIKE
Filed Jan. 30, 1952
3 Sheets-Sheet 1
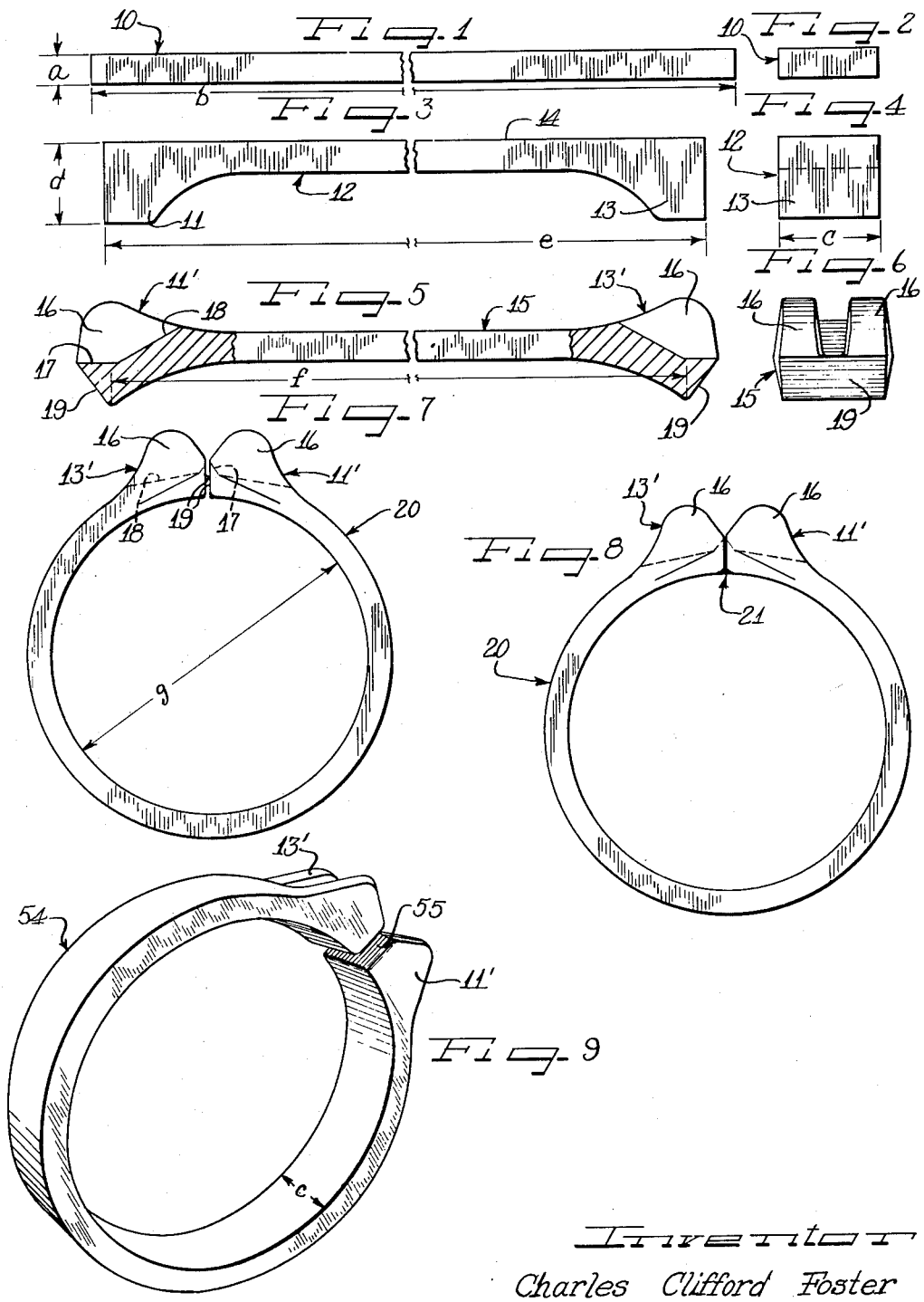
Inventor
Charles Clifford Foster
Hill, Sherman, Meroni, Gross & Simpson Attys July 17, 1956 C. C. FOSTER 2,754,576
FABRICATION OF FORGED BRAKE BAND AND THE LIKE
Filed Jan. 30, 1952 3 Sheets-Sheet 2
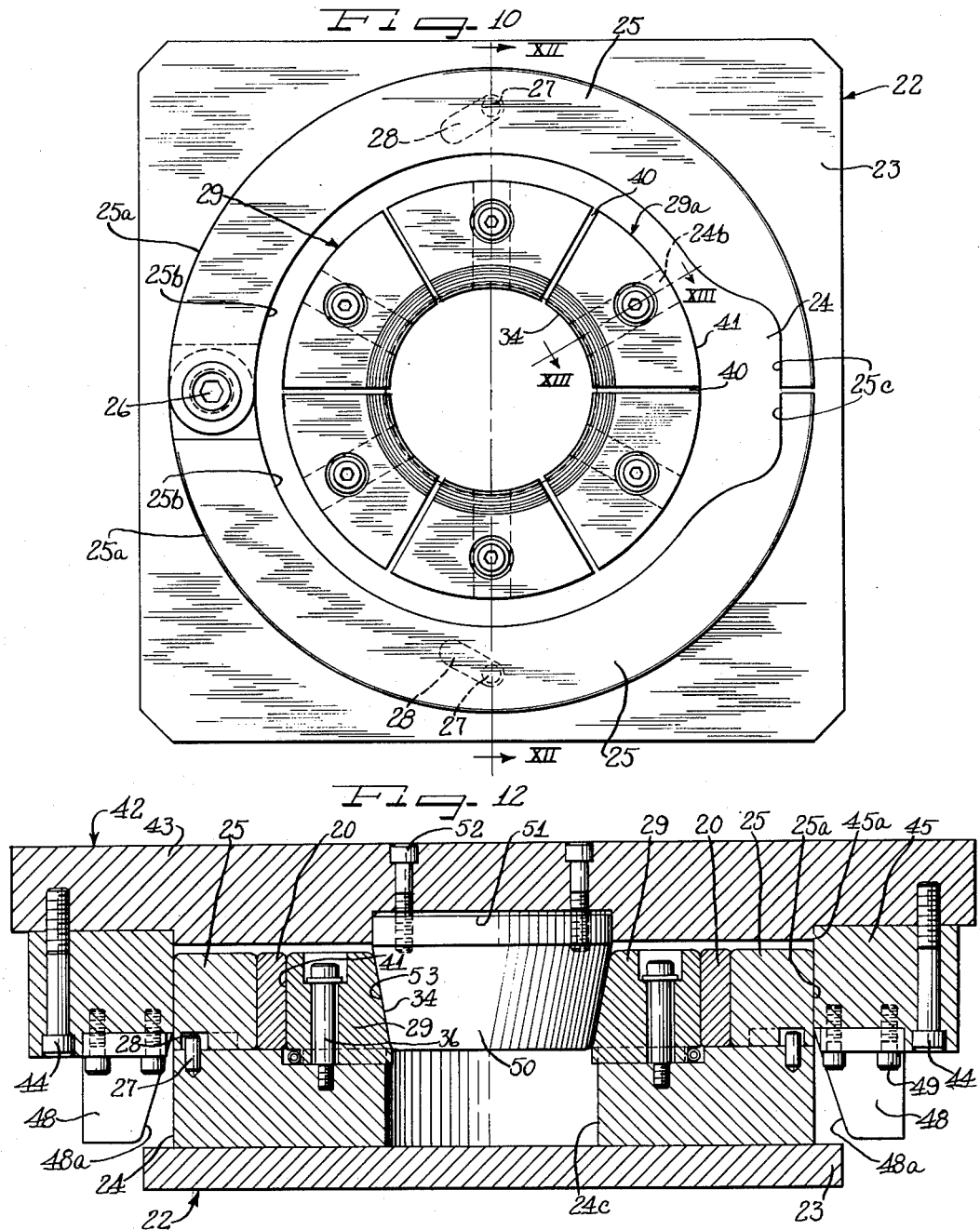
Inventor
Charles Clifford Foster
by Hill, Sherman, Meroni, Gross & Simpson
Attys

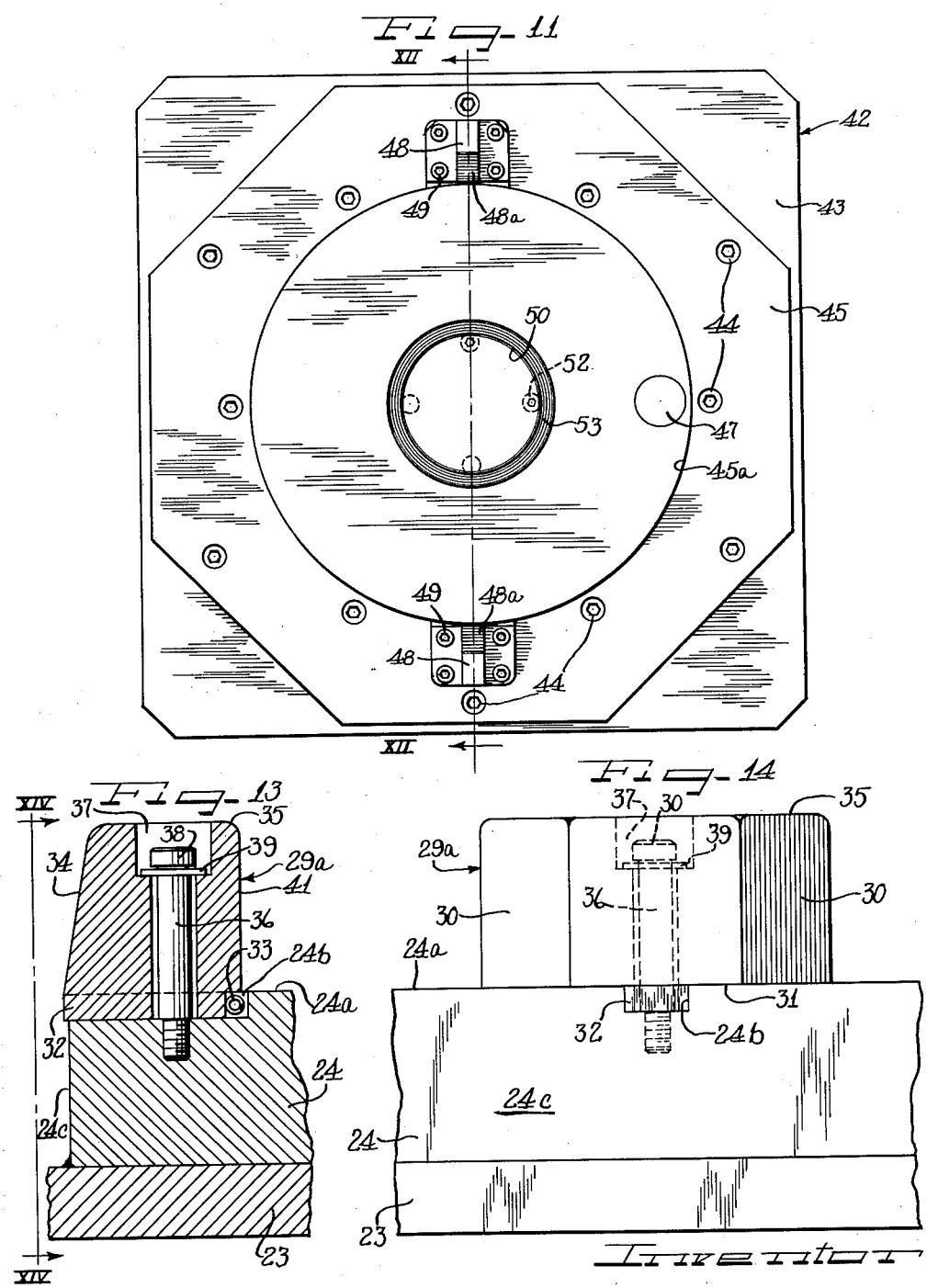

2,754,576

FABRICATION OF FORGED BRAKE BAND AND THE LIKE

Charles Clifford Foster, Berwyn, Ill., assignor to Kropp Forge Company, Chicago, Ill., a corporation of Illinois Application January 30, 1952, Serial No. 269,060

2 Claims. (Cl. 29—481)

This invention relates to an improvement in the fabrication of articles of forgeable material having the ultimate shape of a split annulus having enlarged end portions, and more particularly, to an improved method of and apparatus for fabricating forged steel brake bands and the like, and the improved products obtained thereby.

This invention is particularly concerned with an improved method of fabricating heavy durable external brake bands for use on brake drums of heavy machinery such as tanks and caterpillar tractors. The use of ropes, flexible fabric or metal straps externally lapped about a rotatable cylindrical axle to control the rotary motion of the axle is, of course, well known. The use of essentially rigid arcuate brake shoes for frictional braking engagement with a portion of the periphery of a brake drum or wheel is, likewise, well known. Recently, however, there has developed a very great need for heavy durable external brake bands of substantial thickness and overall size, which are used, for example, in cooperation with brake drums for steering tanks.

Such external brake bands require a substantial braking surface, and, accordingly, are adapted to frictionally engage substantially the entire brake drum periphery, as contrasted to the usual brake shoe which is adapted to contact only a relatively small portion of the drum periphery. Also, such brake bands may not be actuated, as brake shoes, by direct application thereagainst of a radially aligned force. Instead, these bands have a split annulus or ring structure and are actuated by comparatively great, opposed tangential forces applied by members which engage the ring at opposite sides of the split therein. The application of such tangential forces results in the application of radial forces at substantially all of the points of contact (disregarding the presence of brake lining) between the brake band and the brake drum periphery. In addition, these brake bands must be particularly sturdy and durable, since they may be employed to control the speed of rotation of the brake drum as well as to prevent completely rotation of the drum by clamping engagement thereof.

Moreover, these external brake bands must have substantial size or body thereto in order to hold up under the strains created by the application of forces of very great magnitude during the braking operation. The dissipation of friction-created heat also requires a substantial amount of body for such brake bands.

It will, of course, be appreciated that such heavy external brake bands, generally made of a metal such as steel, cannot possibly be fabricated by means of a commercially feasible die drawing operation, for example. In general, it has been the practice heretofore to cut such brake bands by the use of suitable machine tools from a stock piece of suitable size. Such cutting of an annular band, for example, from a suitable stock piece must necessarily result in different grain structural alignment in the metal at different points in the annulus.

Another problem confronting the machine operation just described is that presented by the general shape of the fastening means or bosses that must be positioned adjacent the split in the annular band to afford means for applying brake actuating forces. Such bosses are preferably contoured according to various curves which are not concentric with each other or with the annular band and which, being thus offset or out of line, complicate additionally the machining thereof. The various practices of welding, bolting, riveting or otherwise fastening separately made bosses to the annular brake bands, likewise, are unduly complicated and also necessarily involve additional fabricating steps and the possibility of further disturbance of the physical properties of the body of the bands, particularly in the region of such fastened bosses.

It can thus be seen that in each case the method (and apparatus) employed heretofore for the fabrication of such brake bands left much to be desired along the lines of simplification of operation as well as control of the ultimate physical properties in the final product.

The instant invention, however, provides a significant advance in this art in that it provides an improved method of and apparatus for fabricating such a brake band by certain forging operations so as to obtain an improved product that is an annular brake band having a circumferentially aligned grain structure and mounting integral upset-drop forged fastening bosses.

It is, therefore, an important object of the instant invention to provide an improved method of and apparatus for fabricating such brake bands or the like articles of manufacture, and an improved product obtained thereby.

It is a further object of the present invention to provide an improved method of fabricating brake bands and the like which comprises the step of sizing a cylindrical sleeve-like piece obtained by welding together the abutting ends of a split steel annulus having circumferentially aligned grain structure and upset-drop forged enlarged end portions, the sizing thereof being accomplished by subjecting the inner periphery of the piece to radially outward forging forces and/or backing the piece against forgingly-forcibly urged die members adapted to define a predetermined outside diameter.

It is another object of the instant invention to provide an improved method of fabricating brake bands and the like, which comprises bending into an annulus a piece of predetermined length obtained by upset-drop forging fastening bosses on opposite ends of rolled bar stock, welding together the abutting ends of the bent piece and thereafter subjecting the welded annulus to an extending and contracting forging operation to size the same in predetermined manner.

It is a yet further object of the instant invention to provide an improved method of fabricating brake bands and the like, and an improved product obtained by carrying out such method, which comprises drop forging each of the ends of a rolled stock piece having upset forged end portions so as to define fastening bosses thereat and also to define the overall length of the resulting piece, bending the resulting piece into an annulus, welding together the abutting ends of the bent piece, and thereafter subjecting the welded annulus to an extending and contracting forging operation to size the same in predetermined manner.

It is yet another object of the instant invention to provide an improved method of fabricating brake bands and the like, and an improved product obtained by carrying out such method which comprises upsetting each of the ends of a rolled bar stock piece, drop forging each of the upset ends thereof to define fastening bosses thereat and also to define the overall length of the piece, bending the resulting piece into an annulus, welding together the abutting ends of the bent piece, thereafter machining the inner periphery to predetermined dimensions, and finally cutting the welded portion to obtain a split-ring external brake band; then subjecting the welded annulus to an extending and contracting forging operation to size the outside periphery of the same in predetermined manner.

It is still a further object of the instant invention to provide an improved method of fabricating brake bands and the like, which comprises upsetting each of the ends of a hot rolled mill bar stock piece, drop forging each of the upset ends to define generally forked-shaped radially extending fastening bosses thereat and also to define the ultimate circumferential length of the piece and to bevel the ends thereof for subsequent radial alignment upon bending of the piece into an annulus, and then bending the resulting piece into an annulus.

It is still another object of the instant invention to provide an improved apparatus for fabricating brake bands and the like, that is a sizing die assembly comprising inner and outer concentric annular die units adapted to press forge a work piece therebetween, said inner die unit comprising a plurality of radially movable peripherally spaced generally pie shape sections presenting arcuate peripheral forging faces and said outside die members comprising a pair of hemi-annular members pivotally mounted at one end and presenting inner peripheral forging faces opposing the inner unit peripheral forging faces; and a cooperating press die annularly recessed to receive said annular die units and having a central tapered boss adapted to urge said pie-shaped sections outwardly and a concentric annular flange portion adapted to urge said hemi-annular members inwardly, when said recessed die is pressingly urged into cooperating position with said annular die units.

Other objects, features and advantages of the present invention will become apparent to one skilled in the art from the following description of the embodiment illustrated in the accompanying drawings in which:

On the drawings:

Figure 1 is a side elevational view of a bar stock piece suitable for use as a starting material in the practice of the instant invention;

Figure 2 is an end elevational view of the stock piece of Figure 1;

Figure 3 is a side elevational view of an upset forging obtained by carrying out the initial upsetting operation of the invention, using the stock piece of Figures 1 and 2;

Figure 4 is an end elevational view of the upset forging of Figure 3;

Figure 5 is a side elevational view with parts shown in section and parts broken away showing a drop forging obtained by carrying out the drop forging operation of the invention, using the upset forging of Figures 3 and 4;

Figure 6 is an end elevational view of the upset-drop forging of Figure 5;

Figure 7 is a side elevational view of a split annularly shaped upset-drop forging obtained by carrying out the bending operation of the invention, using the upset-drop forging of Figures 5 and 6;

Figure 8 is a side elevational view of the split annulus of Figure 7 after the abutting end faces thereof have been welded and after the sizing operation of the instant invention has been completed;

Figure 9 is a view in perspective of a finished external brake band, obtained by machining to size the inner peripheral surface of the annulus of Figure 8 and reopening or cutting the welded split portion thereof;

Figure 10 is a top plan view of the bottom die of the sizing die assembly of the invention, normally presenting upwardly extending concentric annular die units adapted to forge a work piece therebetween;

Figure 11 is a bottom plan view of the top die of the sizing die assembly of the invention normally presenting downwardly extending die portions for cooperating with the die of Figure 10;

Figure 12 is a sectional elevational view showing the dies of Figures 10 and 11 in cooperating position, the sectional view of the die of Figure 10 being taken substantially along the line XII—XII thereof and the sectional view of the die member of Figure 11 being taken substantially along the line XII—XII thereof;

Figure 13 is an enlarged sectional elevational fragmentary detail view of a movable pie section of the bottom die shown in Figure 10, taken substantially along the line XIII—XIII thereof; and Figure 14 is an enlarged elevational fragmentary detail view taken from the line XIV—XIV of Figure 13.

As shown on the drawings:

In Figures 1 and 2, the reference numeral 10 indicates generally a substantially rectangularly cross sectioned stock piece of suitably forgeable material, such as a hot rolled mill bar steel stock piece sheared to a predetermined length, which may be used in carrying out the initial upset forging operation of the invention.

Such a metal stock piece 10 may have, for example, a thickness $a$ of about one inch, a length $b$ of about 54 inches and a width $c$ of about 3½ inches. Prior to carrying out the initial upsetting step in the process of the invention the work piece 10 is heated to suitable forging temperatures in the manner well known in the art.

In the particular upsetting operation of the invention, the work piece 10 is heated first at one end only thereof in order to prepare that end for the upset forging operation; and the work piece 10 is then positioned between cooperating upset forging dies (not shown), which cooperate during operation to apply opposed forces longitudinally of the work piece 10 so as to effectively expand or increase the cross sectional area of the same at the heated end portion thereof.

The net result of such upset forging operation, in the instant invention, is the creation of a boss portion, for example, at 11, which has an enlarged thickness $d$ of perhaps 2½ inches and which extends from the extreme end back toward the middle of the resulting upset forging designated generally by the reference numeral 12 approximately an equal distance. After the enlarged end 11 of the upset forging 12 is sufficiently cooled and the opposite end has been suitably heated substantially the upset forging operation is repeated on the opposite end so as to obtain a similarly shaped boss 13.

The manner in which upset forging operations are carried out is generally well known in the art and need be described only briefly herein. In such an operation the stock piece 10 may be positioned vertically or horizontally, and the cooperating anvil and hammer dies engage in relative movement accordingly in the vertical or horizontal direction. The particular portion of the work piece 10 which is to be changed in shape during the upsetting operation, which in this case is one end only (at a time), is heated to forging temperature prior to the commencement of the operation. In general, the instant upsetting operation may be carried out by the use of so-called "open" dies. Extreme accuracy in the shaping of the upset bosses 11 and 13 is not required since as will be pointed out later, these bosses are subjected to a subsequent forging operation.

As can be seen, the cross sectional area expansion obtained by carrying out the upsetting operation described herein is about 2½ to 1, and in the practice of the invention is preferably about 2–3 to 1. The resulting overall length $e$ of the upset forging 12 is about 45½ inches in the example shown herein. The overall reduction in length thus obtained is about 6 to 5, and in the practice of the instant invention such reduction is preferably about 10 to about 9–7.

As can be seen, the upset forging operation of the instant example did not involve an increase in the width $c$ of the stock piece; and also the forging was so carried out that the bosses 11 and 13 were produced on one side only of the work piece, the remaining side 14 being maintained substantially flat. It will, of course, be appreciated that such results are obtained by the use of die arrangements in the manner well known to those skilled in the art and no detailed description thereof is necessary herein.

Referring now to Figures 5 and 6, the next step in the process of the instant invention involves the fabrication of the drop forging herein designated by the reference numeral 15. The manner in which drop forging operations are carried out is, likewise, generally well known in the art and need not be described herein in any great detail. In such an operation the cooperating dies (not shown) define substantially the exact shape of the article to be forged. Such an operation is, therefore, particularly useful in obtaining a forging of the precise contour and size ultimately desired. After repeated hammering or pressing of the hammer die against the anvil die, with the work piece therebetween, the piece assumes the desired form of the drop forging and the two dies come face to face, causing the slight amount of excess of metal present to extrude as flash, outwardly in the plane defined by the contiguous faces of the two dies. The operation of trimming of the flash, which is actually a part of the drop forging operation and is carried out as the last step thereof, is carried out in the manner well known in the art and, therefore, need not be here described.

Referring to the specific example of the drop forging 15 of Figures 5 and 6, in the fabrication of the drop forging 15, one of the upset forging bosses 11 and 13, for example, the boss 11, is heated to the desired forging temperature. The heated end 11 of the upset forging 12 is then placed between the drop forging dies (not shown), one of which should, of course, be an "open-end" die for the sake of convenience so that the remaining rather extensive length of the upset forging 12 need not be contained in a die. It will, of course, be appreciated that such a drop forging operation may involve coaction between the dies either laterally or longitudinally of the heated boss 11.

In the instant drop forging operation, the finished drop forged boss, designated generally by the reference numeral 11', comprises a pair of upstanding generally hemicylindrical, spaced ears 16, 16. The ears 16, 16 extend upwardly along each side of the boss portion 11' and have therebetween a recess extending inwardly along the generally horizontal floor portion 17, aligned longitudinally of the forging 15, and then angularly upwardly along a second inwardly extending floor portion 18. The lower extremity of the drop forged boss 11' has a generally beveled face 19, which, as will be pointed out in greater detail later herein, defines a plane which in the ultimately formed annular member extends radially with respect thereto.

After the drop forging operation involved in the preparation of the finished boss portion 11' has been completed the boss portion 13 is then heated and the drop forging thereof is carried out in substantially the same manner to obtain the opposite finished boss portion, designated generally by the reference numeral 13'.

In particular, one additional feature involved in the preparation of the finished drop forged boss portion 13' is the step of simultaneously making a substantially accurate definition of the overall length of the drop forging 15. The operation of defining the overall length is accomplished by the use of a so-called "back stop" which maintains a fixed position for the drop forged end 11' with respect to the drop forging dies (not shown) then carrying out the drop forging of the opposite boss portion 13'. It will, of course, be appreciated that the particular overall dimension of the length which it is desired to control is the distance f between the bottom inward edges of the beveled faces 19. Since it is intended that the opposite beveled faces 19, 19 will be aligned contiguously in a substantially radially extending plane in the ultimately formed annulus hereinafter to be described, the distance f will therefore determine the inner circumference of such annulus. In the example here shown the distance f should be about 45±⅛ inches.

The next step in the instant process involves the formation of the split annulus herein designated generally by the reference numeral 20 in Figure 7. In general, bending operations are well known in the metal treating art, although several different procedures are employed. In the instant process the preferred procedure involves heating the entire drop forging 15 and then bending the same by means of a hydraulic bending fixture or "bulldozer" (not shown) which tends to roll the heated forging 15 around a collapsible mandrel (not shown), thereby making a plurality of successive U-shaped turns therein until a substantially annular piece such as the split annulus 20, herein shown, is obtained. In the instant example, the annulus inside diameter g is about 14 inches. In the instant bending operation only an approximately annular shape in the piece 20 is necessary since subsequent sizing operations, to be described hereinafter, are capable of taking care of finer corrections.

In particular, it is important to note the resulting arrangement of the allochirally mated upset-drop forged bosses 11' and 13' in the resulting split annulus 20. As can be seen, the beveled faces 19, 19 are now positioned contiguously on either side of the split in the annulus 20. The ears 16 in each of the boss portions 11' and 13' are now longitudinally spaced with respect to the annulus 20 and extend radially outwardly therefrom. The floors 18 of the recesses between the ears 16 are now more or less aligned in a plane generally tangential to the annulus 20.

The next step in the instant operation involves the fastening of the boss portions 11' and 13' together by a suitable means which will prevent their separation during the subsequent sizing operation, which, as will be pointed out hereinafter, is intended to effect the necessary deformation of the body portion of the annulus 20 in order to coin the same into a desired final contour, particularly with respect to the outside dimensions thereof.

Although other fastening means may be used, it has been found particularly advantageous in the practice of the instant invention to weld the contiguous faces 19, 19 together. Preferably such faces are arc welded along all four edges, that is, the longitudinally extending top and bottom edges and the radially extending front and back edges. Again, arc welding in general is a well known art and need not be described herein in further detail. The resulting welds, herein designated generally by the reference numeral 21, furnish a suitably strong fastening means for the subsequent steps in the instant invention.

In general, the sizing operation of the instant invention involves the use of a unique die arrangement whereby the welded annulus 20 is subjected to an extending and/or contracting forging operation to size the same in predetermined manner. The operation involves subjecting the heated welded annulus 20 to forgeable forces between die members adapted to define a predetermined outside diameter therefor and radially movable die members adapted to exert outwardly directed force along a substantial inside peripheral area of the annulus 20.

The precise character of the sizing operation may best be appreciated from a consideration of the operation of the press die assembly of the invention, various views of which are shown in Figures 10-14 inclusive.

Referring to Figure 10, wherein the reference numeral 22 designates generally a bottom die of the assembly, it will be seen that the bottom die 22 has a supporting normally horizontally positioned flat rectangularly shaped table 23. Centrally positioned on the top of the table 23 and suitably fixed thereto (by means not shown) is a generally annular base 24. A pair of allochirally mateable hemi-annular arms 25, 25 are pivotally mounted at one end of each on the base 24, by means of a suitable bolt assembly 26 passing through suitable apertures in the arms 25 and threadedly engaged in the base 24, in a manner well understood by skilled workers.

The bolt assembly 26 permits free pivotal movement of the arms 25, 25 about a pivot point defined by the bolt; but the extent of the pivotal movement of each arm is limited by a pin 27 fitted in a recess in the top surface of the annular base 24 about 90° from the bolt 26 and extending upwardly into an elongated slot-like recess 28 in the arm 25, which recess 28 cooperates with the pin 27 to limit the pivotal or swinging movement of the arm 25, as will be readily understood.

The outside peripheral walls 25a of the arms 25 are adapted to be aligned with the outside peripheral walls of the base 24, although the arms 25 maybe moved in and out of such alignment by their pivotal movement. The inside peripheral walls 25b of the arms 25, as can be seen in Figure 10, are adapted to be positioned so as to have substantially the shape and contour of the outside peripheral walls of the welded annulus 20. The extremities 25c of each of the arms 25 opposite the pivot-bolt 26 have their inside peripheral surfaces contoured to the general outside peripheral shape of the corresponding bosses 11' and 13'.

Spaced inwardly from the arms 25 is a die unit, designated generally by the reference numeral 29, which is annularly shaped and positioned concentrically of the base 24 and the arms 25; rising upwardly above the inner periphery of the base 24, to approximately the same height as the arms 25, which height is substantially the longitudinal dimension (i. e., the width c) of the welded annulus 20. As can be seen from Figure 10, the annular die unit 29 comprises six generally pie-shaped substantially identical sections one of which is designated by the reference numeral 29a and is shown in detail in Figures 13 and 14.

Referring to Figures 13 and 14, it can be seen that the pie-section 29a has the shape of approximately one-sixth of the annular unit 29, cut along radially extending surfaces 30, 30. The major portion of the bottom face 31 of the pie-section 29a is slidably mounted upon the flat top face 24a of the base 24, but central generally elongated rectangular depending radially aligned boss 32 integral with the pie-section 29a is slidably engaged by a radially aligned groove or recess 24b so as to permit radial movement of the pie-section 29a. The groove 24b extends from the inner peripheral wall 24c of the base 24 radially outwardly substantially the radial thickness of the pie-section 29a and, at the outer extremity thereof, there is mounted a spring member 33 for resiliently urging the pie-section 29a (via the boss 32) inwardly so that the boss 32 normally extends inwardly of the inner base wall 24c a short distance (Figure 13). The inner peripheral wall 34 of the pie-section 29a, however, is tapered outwardly from the boss 32 so that it merges curvingly with the top wall 35 of the pie-section 29a along a line outside of the vertical projection of the inner peripheral base wall 24c.

Vertical movement of the pie-section 29, is prevented by means of a bolt 36 threadedly engaged with the base 24 in a recess in the central region of the floor of the radial groove 24b. The bolt 36 is positioned in an aperture 37 in the pie-section 29a. As can be seen the aperture 37 has an enlarged opening or mouth in the top wall 35 extending downwardly a short distance to receive completely the bolt head 38 and washer 39; the remainder of the aperture 37 is somewhat narrower cooperating with the mouth portions to define a shoulder to retain and slidably engage the washer 39 and to permit limited free radial movement of the pie-section 29a relative to the bolt 36. The narrowed aperture 37 permits radial movement of the pie-section 29a, for example, in the neighborhood of ¼ to ⅜ an inch in a die of the size suitable for use in the welded annulus 20 of the instant example.

It will be appreciated that each of the other pie-sections of the unit 29 has substantially an identical structural arrangement and each is peripherally spaced from the others (as at 40 in Figure 10) so as to permit radial movement of each.

It will thus be seen that the vertically rising outer peripheral face or wall 41 of each pie-section 29 may be urged outwardly toward the inner peripheral face 25b of the arms 25, in response to outward radially directed force against the inner peripheral pie-section face 34; and the inner peripheral face 25b of the arms 25 may be urged in the opposite radial direction by inward radially directed force against the outside arm walls 25a. The press die unit, indicated generally by the reference numeral 42, is adapted to supply both such forces simultaneously.

Referring to Figures 11 and 12, it will be seen that the press unit 42, which is the top die of the assembly, has a supporting normally horizontally positioned flat rectangularly shaped table 43. Centrally positioned on the bottom of the table 43 and suitably fixed thereto by bolts, as at 44, is a generally annular frame 45 extending downwardly approximately the longitudinal dimension c of the welded annulus 20. As can be seen in Figure 11, the inner peripheral wall 45a of the frame 45 is cylindrical in shape; preferably the inner frame 45a and the outer arm walls 25a are of identical contour, such as each being truly cylindrical, so that extensive surface contact therebetween may be made (as in the assembled position shown in Figure 12), for the uniform application of forces therebetween.

As will be appreciated, when the arm walls 25a and the frame walls 45a are in snug forced contact the exact position of the inner arm walls 25b is fixed. This exact position of the inner arm walls defines the exact outside shape and contour of the welded annulus 20; and the design of the arms 25 and the cooperating frame 45 may thus be employed for the purpose of accurately defining the outside dimensions of the welded annulus 20. The arms 25 thus are capable of forgingly urging the welded annulus inwardly, or contracting the same, as well as backing the welded annulus 20 up so that expansion thereof may not take place past the desired predetermined outside dimensions.

Certain other features of the press die unit 42 are adapted to perfect the cooperation between the frame 45 and the arms 25. For one thing, a dish-shaped recess 47 in the press table 43 is positioned to receive the elevated portions of the bolt assembly 26 when the units 22 and 42 are in cooperating positions. Also, cam-like guides 48, 48 are mounted in cooperating recesses on opposite sides of the frame 45 by bolts 49. The guides 48 extend downwardly from the frame 45 and present inwardly tapering inner faces 48a, 48a for cam-cooperation with the outer arm walls 25a to suitably align the same for cooperation with the inner frame walls 45a.

During the press-cooperation between the units 22 and 42, the inwardly directed forging forces obtained by frame 45-and-arms 25 cooperation are accompanied by simultaneous opposing outwardly directed forging forces obtained by cooperations between the pie-sections 29 and the tapered boss 50.

The tapered, downwardly-apexed frusto-conical boss 50 is suitably mounted in a central cylindrical recess 51 in the table 43, affixed thereto by bolts 52 and extending downwardly therefrom. The tapered walls 53 of the boss 50 have substantially the taper of the inner pie-section walls 34; for cooperation therewith over an extensive force transmitting surface area. As can be seen from Figure 12, downward urging of the top unit 42, as by means of a forging press (not shown) wherein the top unit 42 is moved against the bottom unit 22 in fixed position, causes cam action between the taper boss 50 and the pie-sections 29 resulting in radial outward urging of the pie-sections 29.

The outer peripheral pie-section faces 41 are, of course, substantially vertical so as to define cooperatively almost the entire inner peripheral walls of a true cylinder, allowance being made for the spaces 40. The faces 41 thus forgingly urge the welded annulus 20 radially outwardly, against the inner arm walls 25b, which as has been explained ultimately arrive at a fixed immovable position so as to define the final outside dimension of the welded annulus 20.

In carrying out the sizing operation, the annulus 20 has first been bent to a sufficiently truly annular shape to fit in the maximum space afforded between the arms 25 and the pie-sections 29, in distended positions. The annulus 20 is, of course, welded to prevent opening and closing at the split portion and then heated to forging temperatures in preparation for the sizing. The heated welded annulus is then placed in between the arms 25 and the pie-sections 29 and the units 22 and 42 are brought into cooperating position (Figure 12) under pressure suitable to accomplish the forge-sizing operation.

The sizing completes the forging operations of the invention and the sized welded annulus 20, thereby obtained, has the precise outside dimensions ultimately desired; and it therefore, need only certain finishing touches for the final preparation of the brake band designated by the reference numeral 54 in Figure 9.

The sized welded annulus 20 is itself a finished product, in that the forging and the like "heavy-machinery" operations are completed. The product thus obtained may be shipped from the forging shop to the final user for example, or the tank or tractor assembly shop, wherein there may be done machining of the inner periphery of the annulus 20 to the precise dimension desired to fit exactly upon new or perhaps used and worn brake drums. After the machining of the inner periphery is done, the split 55 between the bosses 13' and 11' may be cut to complete the brake band 54. Plating and the like treatments of the inner periphery of the band 54 may be carried out to improve the operational characteristics of this surface. In many such subsequent operations, and in particular in the machining of the inner periphery of the band 54, it is advantageous to have the weld 21 holding the ends of the annulus together to facilitate handling thereof.

In each of the forging operations herein described the temperatures (usually up to about 1000° F.) and heating and cooling methods employed are those well known in the art and the skilled operator may readily select such operational conditions most suitable for his particular purpose. Also, the upset drop forging steps herein mentioned might be carried out simultaneously at one end and then at the other end. The advantages of first upsetting and then drop forging include better metal refinement, more precision in control of ultimate shop as well as length and more flexibility in the drop forging operation, for example, permitting such operation to take place by means of lateral or longitudinal die motion with respect to the upset forging.

The instant invention provides a very important advantage over the prior operations in that it permits maximum exploitation of the metallic grain structure.

As is well known, the purpose of subjecting metal to mechanical working is not merely that of bringing it into a desired shape. Mechanical work affects the structure and properties of most metals and alloys in a markedly favorable manner. During normal solidification of a metal from fusion the formation of a crystalline structure takes place. Such crystalline structure is usually quite coarse. Although, whatever the treatment to which metal may be subjected, it remains essentially crystalline, the size or scale of that crystal structure is highly important as affecting physical behavior. Also, mechanical working breaks down the original "cast" structure and replaces it by much finer and more satisfactory structure.

In addition, mechanical working particularly in the case of steel, serves to close up and perhaps to bring about welding of cavities existing in the cast metal. It also brings about a redistribution of the non-metallic impurities. These become elongated in the direction in which the metal is caused to flow under mechanical treatment and tend to confer upon the material something which has the appearance of grain or fiber. Although there is no true fiber in any metal, this so called "grain" structure is a recognized physical characteristic of metal.

As can be appreciated the grain structure in the initial stock piece 10 is essentially a longitudinal parallelly aligned grain structure obtained by rolling the stock piece 10 into ultimate shape.

The upsetting operation does not disturb the longitudinal grain structure of the main body of the resulting upset forging 12 and, in addition, the upsetting at the ends of the forging 12 has the effect of improving the physical properties thereof, particularly for the purpose of mounting fastening means to resist longitudinal pull.

It will, likewise, be appreciated that the bending and subsequent sizing operations do not appreciably affect the generally longitudinal alignment of the grain structure initially present in the rolled bar stock piece 10. The net result is a circumferentially aligned parallel grain structure through the main body of the annulus 20 and extremely tough tangential force resisting fastening bosses 11' and 13'.

It will, of course, be understood that various details of construction may be varied to a wide range while not departing from the principles of this invention, and it, therefore, is not the purpose to limit the patent granted hereon otherwise necessitated by the scope of the appended claims:

I claim as my invention:

1. A process of forming brake bands and the like of size and shape too substantial to be die drawn, which comprises upsetting one end of hot-rolled mill bar steel sheared to a predetermined length so as to accomplish a 2–3 to 1 cross-sectional area expansion thereat; heating and upsetting the opposite end in like manner; drop forging one of such upset ends to form thereat fastening means; drop forging the other upset end to simultaneously form thereat fastening means and obtain a predetermined overall length for the resulting upset drop forging, hot-bending the forging into a split annulus, arc welding together the abutting ends of the split annulus, and thereafter sizing the welded annulus by subjecting the same to forgeable forces between die members adapted to define a predetermined outside diameter therefor and radially movable die members adapted to exert outwardly directed force along a substantial inside peripheral area of the annulus.

2. A process of forming brake bands and the like of size and shape too substantial to be die drawn, which comprises upsetting one end of hot-rolled mill bar steel sheared to a predetermined length so as to accomplish a 2–3 to 1 cross-sectional area expansion thereat; heating and upsetting the opposite end in like manner; drop forging one of such upset ends to form thereat fastening means; drop forging the other upset end to simultaneously form thereat fastening means and obtain a predetermined overall length for the resulting upset-drop forging, hot-bending the forging into a split annulus, arc-welding together the abutting ends of the split annulus, thereafter sizing the welded annulus by subjecting the same to forgeable forces between die members adapted to define a predetermined outside diameter therefor and radially movable die members adapted to exert outwardly directed force along a substantial inside peripheral area of the annulus, next cutting to a predetermined inside dimension the inner peripheral walls of the sized welded annulus, and finally splitting the product by cutting the same at the arc-welding therein.

(References on following page)

References Cited in the file of this patent

UNITED STATES PATENTS

| | | |
|---|---|---|
| 768,615 | Moore | Aug. 30, 1904 |
| 1,016,068 | Forsyth | Jan. 30, 1912 |
| 1,060,320 | Clark | Apr. 29, 1913 |
| 1,224,805 | Stevenson | May 1, 1917 |
| 1,338,462 | Rydbeck | Apr. 27, 1920 |
| 1,522,149 | Sindelar | Jan. 6, 1925 |
| 1,647,221 | Geatty | Nov. 1, 1927 |
| 1,760,560 | Kranz | May 27, 1930 |
| 1,878,520 | Hughes | Sept. 20, 1932 |
| 1,894,321 | Nelson | Jan. 17, 1933 |
| 1,926,064 | Sawtelle | Sept. 12, 1933 |
| 1,943,089 | Rosenberg | Jan. 9, 1934 |
| 2,141,576 | Warr | Dec. 27, 1938 |
| 2,143,458 | Sinclair | Jan. 10, 1939 |
| 2,300,850 | Wolcott | Nov. 3, 1942 |
| 2,324,982 | Kuhn | July 20, 1943 |
| 2,386,246 | Mapes | Oct. 9, 1945 |
| 2,462,080 | Erb | Feb. 22, 1949 |
| 2,478,231 | Bowers | Aug. 9, 1949 |